H. G. STUART.
OHM METER.
APPLICATION FILED FEB. 24, 1917.

1,275,786.

Patented Aug. 13, 1918.

WITNESSES

INVENTOR
H. G. Stuart.
BY
ATTORNEYS

UNITED STATES PATENT OFFICE.

HARRY GOULD STUART, OF PATERSON, NEW JERSEY.

OHM-METER.

1,275,786.

Specification of Letters Patent.

Patented Aug. 13, 1918.

Application filed February 24, 1917. Serial No. 150,721.

*To all whom it may concern:*

Be it known that I, HARRY G. STUART, a citizen of the United States, and a resident of Paterson, in the county of Passaic and State of New Jersey, have invented a new and Improved Ohm-Meter, of which the following is a full, clear, and exact description.

This invention relates to electrical measuring instruments, and more particularly to a direct reading ohm-meter.

The invention has for its general objects to provide an improved electrical measuring instrument of the character referred to which embodies an ammeter and a voltmeter arranged in a special manner and having respectively a movable dial and a hand or indicator so correlated to the dial that by means of the two it is possible to read directly the resistance of a conductor to be measured, the instrument being of comparatively simple and inexpensive construction, unitary or self-contained, requiring only connections with a cell or other source of current and a conductor of unknown resistance to be measured, and being direct reading it eliminates the necessity of two readings according to the old ammeter and voltmeter method and the computation based on Ohm's law, and since separate readings and computations are avoided, the liability of error is reduced to a minimum.

Further advantages of the ohm-meter are—that no adjustment is required; it may be constructed for any range and its accuracy is limited only by the accuracy of the ammeter and voltmeter units employed, and it may be adapted to alternating as well as to direct current instruments.

For a more complete understanding of the invention reference is to be had to the following description and claims taken in connection with the accompanying drawing, in which similar characters of reference indicate corresponding parts in both the views, and in which—

Figure 1:
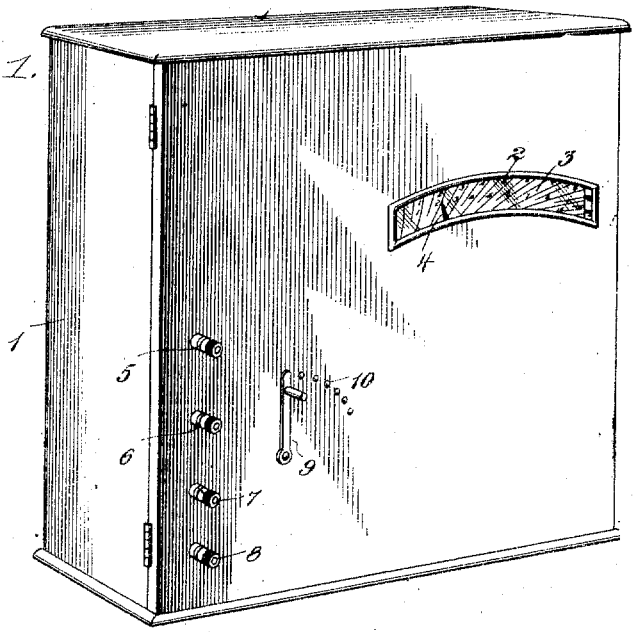
Figure 1 is a perspective view of the ohm-meter.
Figure 2:
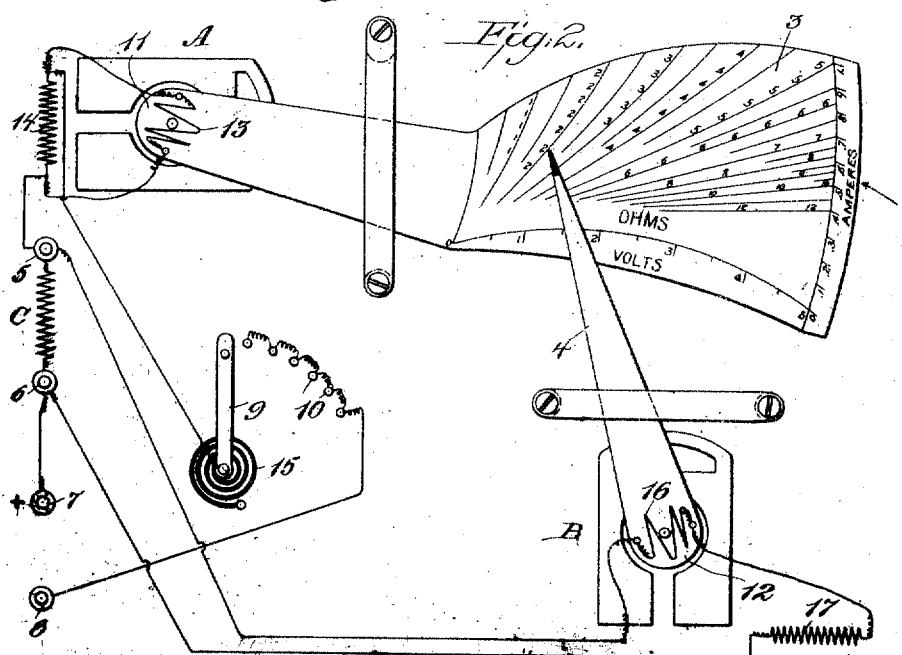
Fig. 2 is a diagrammatic view.

Referring to the drawing, 1 designates a casing of any suitable character which has a glazed opening 2 through which is revealed a scale 3 and a hand or indicator 4. On the casing are binding posts 5 and 6 for connection with the conductor whose resistance is to be measured, and also on the casing are binding posts 7 and 8 which are adapted to be connected with cells or other source of current. On the outside of the casing is a rheostat lever 9 which is adapted to be moved over a series of contact buttons 10.

Within the casing is an ammeter unit A and a voltmeter unit B. The movable element 11 of the ammeter carries or is operatively connected with the scale or dial 3, the same being in the form of an arm extending from the movable element of the ammeter. The movable element 12 of the voltmeter carries or is operatively connected with the hand or indicator 4, which extends from the movable element 12 in a direction approximately at right-angles to the scale-carrying arm of the ammeter. Normally the scale 3, when in zero position, is farthest away from the voltmeter, and as the ammeter is energized the scale moves toward the voltmeter. Normally the indicator 4 is, when in zero position, close to the ammeter, and when the voltmeter is energized the indicator moves away from the ammeter. Thus the scale and indicator overlap, and by the position of the indicator with respect to the dial or scale, the ohmic value of a conductor to be measured can be immediately seen by means of the curves or lines on the scale and the numerals associated therewith.

The winding 13 of the ammeter is in series with the cell or source of current and the conductor C, the resistance of which is to be measured, and parallel with the winding 13 is a shunt 14. One terminal of the winding 13 is connected with the lever 9 of the rheostat, which lever is normally held in open circuit position by a spring 15. The contact buttons of the rheostat are connected with the binding posts 8, so that the rheostat is in series with the cell. When the lever 9 is moved to the right, any amount of resistance can be introduced. The purpose of the rheostat is two-fold. First, it protects the instrument from the effects of excessive currents, and second, in case the value of the resistance to be measured is such that, without any external resistance either the ammeter dial or voltmeter indicator, or both, should be moved beyond the maximum point, the rheostat by means of its gradually decreasing resistance, increases the current flow gradually, thus bringing both ammeter dial and voltmeter indicator slowly from a zero position to a point of maximum accuracy. It must be borne in mind that the introduction of this external resistance will not affect the relation of the current flow through the conductor to the potential difference between the extremities of the conductor. Both quantities will increase in the same ratio. The ohm-meter, measuring a constant relation between the current flow through the conductor and the potential difference between its extremities, will be unaffected by the introduction of an external resistance not included between the points.

The winding 16 of the voltmeter is connected in parallel with the conductor C, and in series with the coil 16 is the voltmeter resistance 17. It will be understood that when the circuit is closed the coils 13 and 16 of the ammeter and voltmeter will be energized and the dial 3 and indicator 4 will move simultaneously, and when they come to rest they will indicate in ohms the resistance of the conductor C.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A direct reading ohm-meter comprising a voltmeter unit, an ammeter unit, each unit having a movable element, a dial on the movable element of one unit, and a hand connected with the movable element of the other unit and movable over the dial, said dial and hand extending approximately at right-angles to each other when in zero position.

2. A direct reading ohm-meter comprising a voltmeter unit, an ammeter unit, each unit having a movable element, a dial on the movable element of the ammeter, and a hand connected with the movable element of the voltmeter and movable over the dial, said dial and hand extending approximately at right-angles to each other when in zero position.

3. A direct reading ohm-meter comprising an ammeter unit, a voltmeter unit, said units having movable elements, a swinging dial carried by the movable element of the ammeter unit, and a swinging indicator carried by the movable element of the voltmeter unit and having its length approximately at right-angles to the length of the dial, said dial having curves with which the indicator coöperates to indicate in terms of ohms the resistance of the element to be measured and the curve at zero being approximately concentric with the axis of movement and the curve successively changing in angle to approximately a radial position at the opposite limit of the scale from zero.

4. A dial for a direct reading ohm-meter adapted to swing about an axis and having a series of curves, the zero curve being approximately concentric with the axis of movement, and the curves successively changing in angle to approximately a radial position at the opposite limit of the scale from zero.

5. A dial for a direct reading ohm-meter adapted to swing about an axis and having a series of curves, the zero curve being approximately concentric with the axis of movement and the curves successively changing in angle to approximately a radial position at the opposite limit of the scale from zero, an ampere scale on one edge of the dial and concentric with the zero curve, and a volt scale on the dial struck from a radius at approximately right-angles from the radius from which the ampere scale is struck.

HARRY GOULD STUART.